US011886929B2

(12) United States Patent
Bai et al.

(10) Patent No.: US 11,886,929 B2
(45) Date of Patent: *Jan. 30, 2024

(54) DEPLOYING CLOUD-NATIVE SERVICES ACROSS CONTROL PLANES

(71) Applicant: Microsoft Technology Licensing, LLC, Redmond, WA (US)

(72) Inventors: Haishi Bai, Carnation, WA (US); Mark Eugene Russinovich, Bellevue, WA (US); Boris Markus Scholl, Kirkland, WA (US); Yaron Schneider, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

This patent is subject to a terminal disclaimer.

(21) Appl. No.: 17/393,252

(22) Filed: Aug. 3, 2021

(65) Prior Publication Data

US 2021/0382761 A1 Dec. 9, 2021

Related U.S. Application Data

(63) Continuation of application No. 16/189,972, filed on Nov. 13, 2018, now Pat. No. 11,099,910.

(51) Int. Cl.
*G06F 9/50* (2006.01)
*G06F 8/60* (2018.01)
(Continued)

(52) U.S. Cl.
CPC .............. *G06F 9/5077* (2013.01); *G06F 8/60* (2013.01); *H04L 41/0893* (2013.01);
(Continued)

(58) Field of Classification Search
CPC ........ G06F 9/5077; G06F 8/60; G06F 9/5072; H04L 41/0893; H04L 41/5003; H04L 41/5041; H04L 67/34; H04L 67/10
See application file for complete search history.

(56) References Cited

U.S. PATENT DOCUMENTS 10,095,488 B2  10/2018  Ebner et al.
10,944,640 B2  3/2021   Bai et al.
(Continued)

FOREIGN PATENT DOCUMENTS

EP  3128418 A1 * 2/2017 ............... G06F 8/60

OTHER PUBLICATIONS

"Non Final Office Action Issued in U.S. Appl. No. 17/136,858", dated Sep. 2, 2021, 9 Pages.
(Continued)

*Primary Examiner* — Eric C Wai
(74) *Attorney, Agent, or Firm* — Ray Quinney & Nebeker; James Bullough

(57) ABSTRACT

The present disclosure relates to systems, methods, and computer-readable media for deploying cloud-native services across a plurality of cloud-computing platforms. For example, systems disclosed herein identify resource identifiers associated with cloud-computing services (e.g., types of services) to be deployed on one or more resources capable of executing or otherwise providing cloud-native services. The systems disclosed herein further generate resource bindings including deployment specifications that include data for deploying cloud-native services on corresponding platform resources (e.g., cloud resources, edge resources). Using the resource bindings, the systems disclosed herein can deploy cloud-native services across multiple platforms via control planes configured to manage operation of resources on the different platforms.

20 Claims, 11 Drawing Sheets

(51) Int. Cl.
*H04L 41/0893* (2022.01)
*H04L 41/5003* (2022.01)
*H04L 41/5041* (2022.01)
*H04L 67/00* (2022.01)
*H04L 67/10* (2022.01)

(52) U.S. Cl.
CPC ...... *H04L 41/5003* (2013.01); *H04L 41/5041* (2013.01); *H04L 67/34* (2013.01); *H04L 67/10* (2013.01)

(56) References Cited

U.S. PATENT DOCUMENTS

| | | | |
|---|---|---|---|
| 2011/0145153 A1* | 6/2011 | Dawson | G06Q 10/10 707/610 |
| 2016/0124734 A1 | 5/2016 | Dvorak et al. | |
| 2016/0139938 A1* | 5/2016 | Dimitrakos | G06F 9/44505 718/100 |
| 2021/0119880 A1 | 4/2021 | Bai et al. | |

OTHER PUBLICATIONS

"Office Action Issued in European Patent Application No. 19809279.3", dated May 10, 2023, 13 Pages.

* cited by examiner

DEPLOYING CLOUD-NATIVE SERVICES ACROSS CONTROL PLANES

CROSS-REFERENCE TO RELATED APPLICATIONS

This application is a continuation of U.S. patent application Ser. No. 16/189,972, filed on Nov. 13, 2018, the entirety of which is incorporated herein by reference.

BACKGROUND

A cloud-computing system refers to a collection of computing devices and resources on which applications including cloud-based services may be implemented. For example, cloud-computing infrastructures often include a collection of physical service devices organized in a hierarchical structure including computing zones, clusters, virtual local area networks (VLANs), racks, fault domains, etc. Indeed, a cloud-computing system provides an environment of computing resources that provides the ability to scale applications and implement functionalities that would not be possible on traditional client devices (e.g., personal computers, mobile devices).

As cloud-computing systems have grown in popularity and increased in complexity, cloud-native services and applications have similarly grown more complex and diverse. For example, different cloud-computing environments have different hierarchies, architectures, and interconnectivities that are implemented across server devices. In addition, cloud-native applications and service instructions often have different formats depending on development tools and/or depending on a particular environment on which a cloud-native application or service is deployed.

Traditionally, cloud-native applications are individually designed and deployed on a specific platform using a specific format. For example, a cloud-native application generally indicates specific resources hosted by a cloud-computing system that deploys the cloud-native application via a control plane that schedules or manages operation of the platform-specific resources. As a result, cloud-native applications often lack portability between formats and platforms. Indeed, deploying the same set of cloud-native services across two different platforms generally involves creating and designing two distinct applications having different platform-specific features and which are independently configured to operate on the two different platforms. As a result, developing and deploying cloud-native applications across different platforms and formats is often expensive and time consuming.

DETAILED DESCRIPTION

Figure 1:
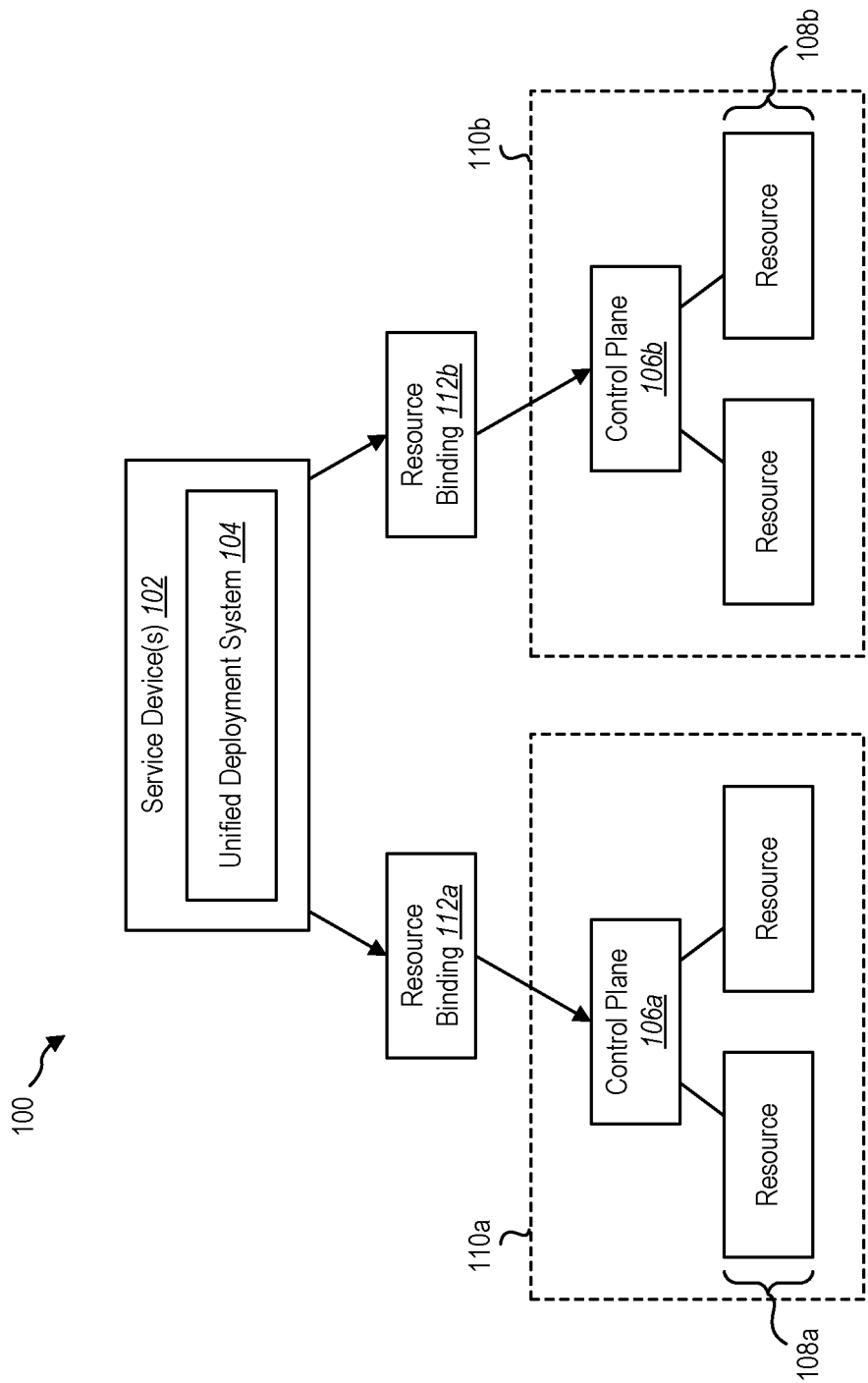
FIG. 1 illustrates an example environment including a unified deployment system for deploying cloud-native services in accordance with one or more implementations.

The present disclosure generally relates to a unified deployment system implemented in connection with a server device (e.g., on a cloud-computing system) to deploy cloud-native services across a plurality of cloud-computing platforms. In particular, as will be described in further detail below, the unified deployment system identifies resource identifiers associated with cloud-computing services (e.g., types of services) to be deployed on one or more resources capable of executing or otherwise providing the cloud-native services. The unified deployment system can further generate a resource binding including a deployment specification that includes data for deploying the cloud-native services associated with the resource identifiers on corresponding platform resources. Using the resource bindings when implementing the services, the unified deployment system can deploy the cloud-native services across multiple platform resources via control planes configured to manage operation of the platform resources.

Implementations of the present disclosure provide benefits and/or solve one or more problems associated with deploying cloud-native services and applications having different formats across multiple platforms. For example, by generating resource bindings associated with corresponding resource identifiers, the unified deployment system facilitates portability of cloud-native services and applications across multiple platforms. Indeed, by generating and utilizing resource bindings in accordance with one or more embodiments described herein, the unified deployment system provides a convenient mechanism for deploying applications and services across different platforms that significantly reduces costs and manpower involved in creating and designing unique applications or service execution instructions to be individually deployed on each of multiple platforms.

In addition, by deploying cloud-native services via multiple control planes, the unified deployment system enhances scalability in deployment of applications across different regions, cloud-computing systems, and across a variety of resources. For example, by deploying different cloud-native services via different control planes, the unified deployment system facilitates deployment of a cloud-native application or collection of cloud-native services across different geographic regions, different devices or groupings of devices, different cloud-computing services, and even across a combination of cloud resources and edge resources. Therefore, the unified deployment system significantly enhances the number and variety of available resources, thereby enhancing functionality of cloud-native applications as well as broadening computing resources available to developers and end-users.

As illustrated in the foregoing discussion, the present disclosure utilizes a variety of terms to describe features and advantages of the unified deployment system. Additional detail will now be provided regarding the meaning of such terms. For instance, as used herein, a "cloud-computing system" refers to a network of connected devices and/or resources that provide various services (e.g., to client devices). A cloud-computing system can refer to a collection of physical server devices organized in a hierarchical structure including computing zones, clusters, virtual local area networks (VLANs), racks, fault domains, datacenters. Cloud-computing systems can host and/or access a variety of resources that provide services invoked by cloud-native services and applications.

As used herein, a "cloud-native service" refers to an operation, a function, or any type of service provided by a computing device on or accessible to a cloud-computing system. In particular, a cloud-native service may refer to any operation or functionality provided via one or more service device(s) on a cloud-computing system or edge device(s) accessible to or in communication with the cloud-computing system. Indeed, cloud-native services may refer to a variety of different types of services provided by a cloud-computing system including, by way of example, infrastructure as a service (IaaS), platform as a service (PaaS), software as a service (SaaS), recovery as a service (RaaS), or any discrete function provided by a computing resource on a particular platform.

As used herein, a "cloud-native application" or simply "application" refers to a program, a file, or code that includes instructions for performing one or more functions or tasks using resources of (or accessible to) a cloud-computing system. In particular, a cloud-native application may refer to a software program, a file, or a portion of code configured to invoke or otherwise access one or more resources or services provided by a cloud-computing system. In one or more embodiments, a cloud-native application includes an identification of services or resources as well as instructions for executing or otherwise implementing one or multiple cloud-native services.

In one or more embodiments described herein, a cloud-native service or application may be deployed using one or more platforms. As used herein, a "platform" refers to a particular application format (e.g., a packaging format), a deployment mechanism, or orchestrators for deploying or implementing the application, and/or an environment (e.g., a cloud architecture) on which the application is implemented. Thus, an application implemented via a corresponding platform may refer to a format, deployment mechanism, and/or environment on which the application is implemented.

As mentioned above, a cloud-computing system can host or otherwise provide access to a number of resources. As used herein, a "resource" refers to computing resources or virtual services (e.g., microservices) provided by or accessible to a cloud-computing system and which executes or otherwise provides functionality corresponding to one or more cloud-based services. Resources include, by way of example, microservices, databases, file folders, load balancers, storage spaces, proxies, or any other service or process registered on a cloud-computing system that may be invoked or otherwise accessed in providing a cloud-native service and/or carrying out instructions included within a cloud-native application. As used herein, a "platform resource" refers specifically to a resource provided by way of a corresponding platform. In addition, a resource may refer to any computing resource hosted by a cloud-computing system (e.g., cloud resources) or a computing resource accessible to the cloud-computing system that is provided by one or more devices outside the cloud (e.g., edge resources).

As discussed above, the unified deployment system can deploy cloud-native services and applications across a plurality of control planes. As used herein, a "control plane" refers to a component (e.g., one or more devices) on a cloud-computing architecture that schedules a cloud-native service on one or more associated resources. For example, a control plane may manage operation of resources by routing network packets, routing information, scheduling execution of instructions, or otherwise managing deployment of cloud-native services to resources. In one or more implementations described herein, a control plane may be associated with and tasked to control a discrete set of resources. In addition, in one or more embodiments described herein, the unified deployment system may be implemented on a control plane (e.g., a federated control plane) to communicate deployment instructions across a plurality of control planes associated with corresponding resources.

As mentioned above, the unified deployment system can generate resource bindings that facilitate deployment of cloud-native services across a variety of platforms. In particular, the unified deployment system can generate resource bindings including information associated with a particular platform to enable a control plane to schedule operation of functionalities associated with a cloud-native service or application on a resource of the platform. For example, the unified deployment system can bind resource identifiers associated with cloud-native services or applications to corresponding resources on a target platform. Additional detail with regard to generating resource bindings and deploying services and applications will be provided below in connection with examples shown in the figures.

Additional detail will now be provided regarding the unified deployment system in relation to illustrative figures portraying example implementations. For example, FIG. 1 illustrates an example environment 100 for generating and implementing a unified deployment system. As shown in FIG. 1, the environment 100 includes one or more server device(s) 102 including a unified deployment system 104 implemented thereon. In one or more embodiments, the server device(s) 102 are implemented on a cloud-computing system.

As illustrated in FIG. 1, the environment 100 includes control planes 106a-b for managing respective resources 108a-b. In particular, a first control plane 106a may schedule or otherwise manage functionality of a first set of resources 108a while a second control plane 106b schedules or otherwise manages functionality of a second set of resources 108b. While FIG. 1 illustrates control planes 106a-b associated with sets of resources 108a-b that each include multiple computing resources, it will be understood that the control planes 106a-b may manage any number of resources. For example, a control plane may manage a single resource or any number of multiple resources.

As shown in FIG. 1, the first control plane 106a and associated set of resources 108a may be implemented on a first platform 110a while the second control plane 106b and associated set of resources 108b may be implemented on a second platform 110b. The different platforms 110a-b may refer to different cloud-computing systems, groupings of server devices (e.g., different clusters, different datacenters), or other division of the resources 108a-b managed by the respective control planes 106*a-b*. In addition, the different platforms 110*a-b* may refer to different formats of services or instructions executed by the respective control planes 106*a-b* on the same cloud-computing system. Moreover, while FIG. 1 illustrates an example in which the control planes 106*a-b* are implemented on different platforms 110*a-b*, the control planes 106*a-b* may include control planes tasked with managing resources via the same platform (e.g., on the same cloud-computing system or that process instructions using the same format or protocols).

The server device(s) 102 and control planes 106*a-b* may be implemented on different networks of devices. For example, the server device(s) 102 may be implemented on a first cloud-computing system while one or both of the control planes 106*a-b* are implemented on a different cloud-computing system. Alternatively, in one or more implementations, the server device(s) 102 including the unified deployment system 104 is deployed on the same cloud-computing system as one or both of the control planes 106*a-b*. Furthermore, the resources may be implemented on the same network of devices as the server device(s) 102 and/or the control planes 106*a-b*.

As shown in FIG. 1, the unified deployment system 104 may deploy cloud-native services to the control planes 106*a-b* by communicating or otherwise providing resource bindings 112*a-b* including resource identifiers and associated platform data (e.g., deployment specifications) to the control planes 106*a-b*. In particular, the unified deployment system 104 can bind information from an application file (e.g., resource identifiers) to information associated with deploying the application file on a platform by generating the resource bindings 112*a-b*. The resource bindings 112*a-b* may include any information that enables the control planes 106*a-b* to implement the cloud-native services on the respective sets of resources 108*a-b* and/or on a respective platform. As will be discussed further below, the resource bindings 112*a-b* may include mapping information that associates resource identifiers for corresponding types of cloud-native services with corresponding platform resources.

The server device(s) 102 and control planes 106*a-b* may communicate over a network using one or more communication protocols or technologies for transmitting data. For example, the server device(s) 102 and control planes 106*a-b* may communicate over a mesh network, the Internet, or any other data link that enables transport of electronic data between the server device(s) 102, control planes 106*a-b*, and computing devices on which respective resources (e.g., cloud resources, edge resources) are implemented.

One or more of the illustrated examples described herein relate specifically to deploying cloud-native services. For instance, the unified deployment system 104 may deploy two discrete PaaS services or discrete functionalities across multiple control planes. Nevertheless, features and functionality related to deploying specific types of cloud-native services described in connection with one or more examples herein may similarly apply to deploying cloud-native applications, application models including resource identifiers, or any type of cloud-native service that can be deployed on a target platform via one or multiple control planes.

Additional detail with regard to deploying an application or cloud-native service will be described in connection with FIG. 2. The illustrated example shows a deployment of a cloud-native service to a specific platform. Similar principles can apply to deploying multiple cloud-native services (e.g., discrete services that make up an application) across multiple control planes on the same or different platforms.

Figure 2:
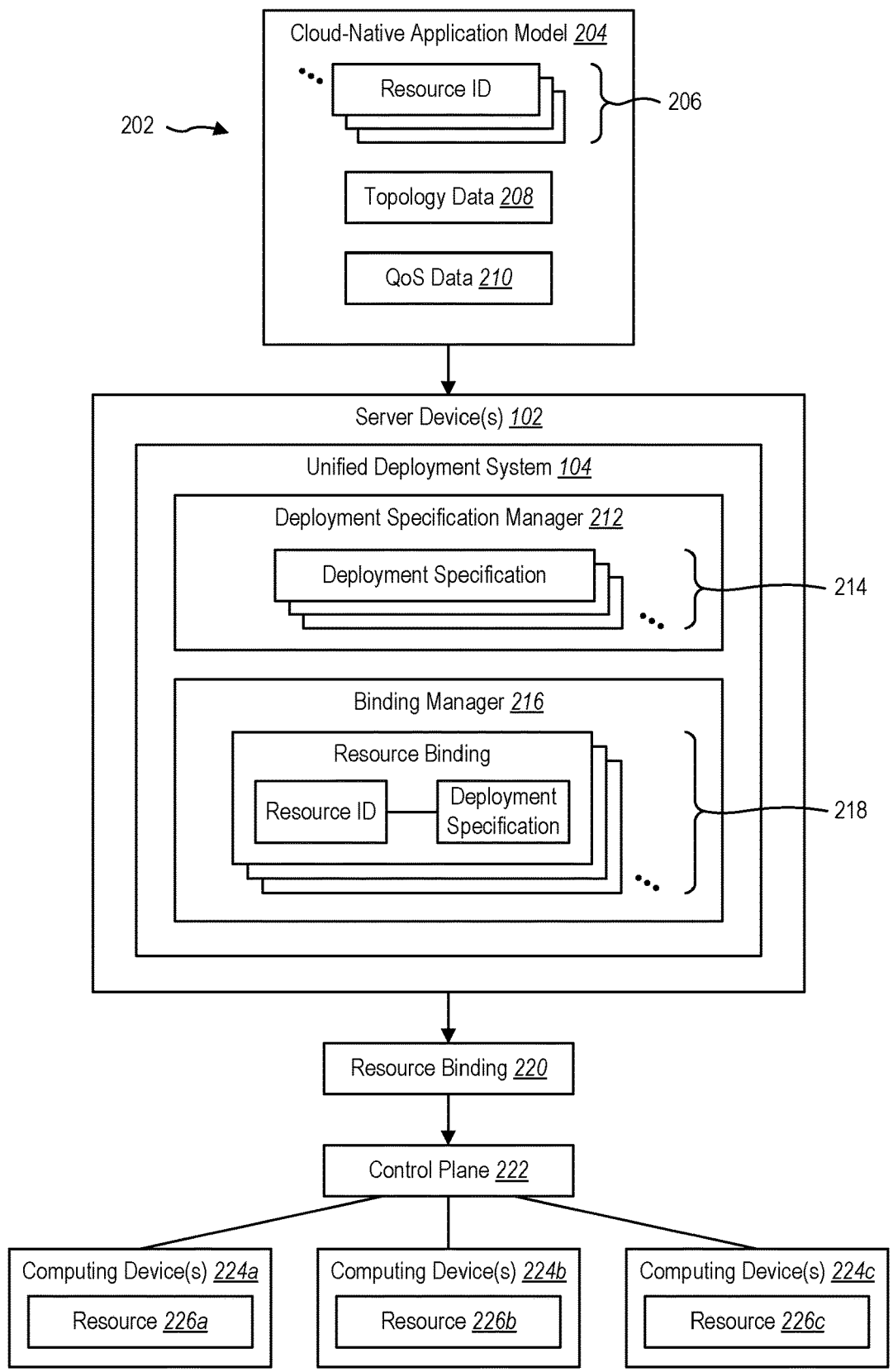
FIG. 2 is an example framework for deploying a plurality of cloud-native services via a control plane in accordance with one or more implementations.

For example, as shown in FIG. 2, the unified deployment system 104 receives application data 202 including an identification of different cloud-native services or types of services to deploy via a cloud-computing system. In particular, the unified deployment system 104 may receive a cloud-native application model 204. As shown in FIG. 2, the cloud-native application model 204 includes resource identifiers 206 associated with different types of functions or services that may be deployed to a cloud-computing system. The resource identifiers 206 can include identifiers of different types of cloud-native services including, by way of example, microservices, databases, file folders, load balancers, storage spaces, proxies, or any other type of cloud-native service implemented on server devices of a cloud-computing architecture.

In addition, the cloud-native application model 204 includes topology data 208 including mesh connections, connection types, or other data about how resources of a cloud-computing system should communicate when carrying out various functions. For example, the topology data 208 may include an identification of endpoints, ports of resources, service devices, or other hardware for connecting resources. In addition, the topology data 208 may include an identification of direct connections, message queues, intermediate devices or routers, messaging buses and reactive streams, or any other component of a cloud-computing system that makes up the topology of an application or collection of related services.

Furthermore, the cloud-native application model 204 includes quality of service (QoS) data 210 including an identification of operating conditions or considerations associated with performing or deploying cloud-native services on a cloud-computing system. For example, quality of service (QoS) data 210 may include one or more restrictions associated with deploying one or more cloud-native services such as a measurement of service availability, a measurement of cost for accessing the service, a load-balance requirement, or a restriction that two different services need to be deployed on different server devices, different groupings (e.g., clusters) of server devices, or on different cloud-computing systems altogether.

Moreover, the cloud-native application model 204 may include platform-neutral data including platform-neutral resource identifiers (e.g., identification of different types of cloud-native services that are not specific to any particular platform) as well as platform-neutral topology data and quality of service (QoS) data. Indeed, the cloud-native application model may include similar features and characteristics as described in application Ser. No. 16/186,167 filed on Nov. 9, 2018, titled "GENERATING AND IMPLEMENTING A PLATFORM-NEUTRAL CLOUD-NATIVE APPLICATION MODEL," which is incorporated herein by reference in its entirety.

As further shown in FIG. 2, the unified deployment system 104 on the server device(s) 102 includes a deployment specification manager 212 and a binding manager 216. Upon receiving the application data 202, the deployment specification manager 212 generates one or more deployment specifications 214. As used herein, a "deployment specification" includes a specification file, a table of mapping data, or other data structure that includes information associated with deploying a cloud-native service or application on a platform. For example, a deployment specification may include platform-specific data that enables a control plane to instantiate or schedule a service or application to provide functionalities associated with the cloud-native service. For instance, a deployment specification may include an address of a server device or grouping of server devices (e.g., a node cluster) as well as information about control planes and associated resources. The deployment specification may further include account information such as a user ID, subscription information, or other user or account-specific information. Indeed, the deployment specification may include any information or data file that the unified deployment system 104 can use in associating resource identifiers with corresponding resources on a cloud-computing system to be used in deploying cloud-native applications or services.

The deployment specification manager 212 can generate any number of deployment specifications 214. For example, the deployment specification manager 212 can generate a number of deployment specifications 214 based on a number of cloud-native service types identified by a plurality of resource identifiers 206. In one or more implementations, the deployment specification manager 212 generates a single deployment specification for each resource identifier associated with a corresponding cloud-native service to be deployed. In addition, or as an alternative, the deployment specification manager 212 may generate a number of deployment specifications for a single resource identifier corresponding to a number of different platforms on which the unified deployment system 104 will deploy the cloud-native service or application. For example, where an application is to be deployed on two different platforms, the deployment specification manager 212 may generate two different deployment specifications 214 including any information that enables deployment of the application across the respective platforms.

In one or more implementations, the deployment specifications 214 include different information based on types of services and platform resources. As a first example, a deployment specification may include an identification of a supported format (e.g., Kubernetes, Service Fabric) an indication of a device (e.g., a device address) or grouping of devices on a cloud-computing system, and instructions for implementing an application or service on the cloud-computing system. The deployment specification can further include identifications of endpoints, ports of resources, service devices, or other hardware for connecting resources.

In addition, or as an alternative, the deployment specification may include logical descriptors of implementation instructions (e.g., rather than a specific device address or application-creation instructions), quality of service (QoS) constraints, one or more intelligent recommendations (e.g., recommended platforms, backup platforms), and scaling instructions indicating how an application should scale or evolve over time. In one or more embodiments, the deployment specification may include links to libraries or other instructions that provide additional information related to deploying one or more cloud-native services.

As further shown in FIG. 2, the unified deployment system 104 includes a binding manager 216. The binding manager 216 can generate resource bindings 218 including associations between resource identifiers 206 and deployment specifications 214. As used herein, a "resource binding" may refer to a file or other data structure including information that associates cloud-native services and corresponding resources on which the cloud-native services are to be deployed. For example, as shown in FIG. 2, the resource bindings 218 may include mapping information or a data file that associates resource identifiers and corresponding deployment specifications. Indeed, the resource bindings 218 may include any information that, when provided to a control plane, enables the control plane to schedule or instantiate a cloud-native service identified by a corresponding resource identifier.

The binding manager 216 can generate a resource binding for each deployment instance. For example, the binding manager 216 can generate a resource binding for each control plane on each platform that a cloud-native service will be deployed. In one or more embodiments, the binding manager 216 generates resource bindings 218 upon receiving the application data 202 and associated deployment specification(s) 214. Alternatively, the binding manager 216 may generate a resource binding upon receiving instructions to deploy a service on a particular platform.

As further shown in FIG. 2, the unified deployment system 104 may provide a resource binding 220 to a control plane 222 for deployment of an application or service(s) defined by the cloud-native application model 204. In addition to or as part of the resource binding 220, the unified deployment system 104 can provide instructions associated with how the application or service should be deployed. For example, while the resource binding 220 includes mapping data associating resource identifiers with a deployment specification, the unified deployment system 104 can additionally provide topology data 208 and/or quality of service (QoS) data 210 to provide further instruction on how a service or application should be implemented. For example, in one or more embodiments, the unified deployment system 104 provides an application file (or the cloud-native application model 204) together with the resource binding 220 to enable the control plane 222 to effectively deploy the cloud-native service(s) identified by the resource identifiers 206.

As shown in FIG. 2, the control plane 222 can schedule or otherwise manage operation resources 226a-c implemented on or provided by way of computing devices 224a-c, which may include a combination of server devices and/or edge devices. In particular, the control plane 222 can manage the resources 226a-c individually or cooperatively to perform functions indicated by the application data 202. For example, the control plane 222 can schedule execution of instructions identified within an application file (or any file indicating a cloud-native service) by the resources 226a-c implemented on the computing devices 224a-c.

Each of the components 212, 216 of the unified deployment system 104 may be implemented on the server device(s), as shown in FIG. 2. Alternatively, one or more of the components 212, 216 may be implemented wholly or partially on one or more additional devices (e.g., a control plane on the same or a different cloud-computing system). In addition, the components 212, 216 of the unified deployment system 104 can include software, hardware, or both. For example, the components 212, 216 of the unified deployment system 104 can include one or more instructions stored on a computer-readable storage medium and executable by processors of one or more computing devices (e.g., server device(s)). When executed by the one or more processors, the computer-executable instructions of the unified deployment system 104 can cause the server device(s) 102 to perform one or more methods or series of acts described herein (e.g., in connection with FIGS. 8 and 9 described below). Alternatively, the components 212, 216 of the unified deployment system 104 can comprise hardware, such as a special-purpose processing device to perform a certain function or group of functions. The components 212, 216 of the unified deployment system 104 can also include a combination of computer-executable instructions and hardware.

FIGS. 3-7 provide examples in which a unified deployment system 104 can deploy cloud-native services in accordance with one or more embodiments. In particular, FIGS. 3-7 are provided by way of example to illustrate features and functionality provided by the unified deployment system 104 in a number of different environments and are not intended to be limiting of a specific embodiment or environment. For example, features and functionality described in connection with deploying a cloud-native service in accordance with an example illustrated by one of the figures may be similarly applied to one or more additional implementations described in connection with another figure.

Figure 3:
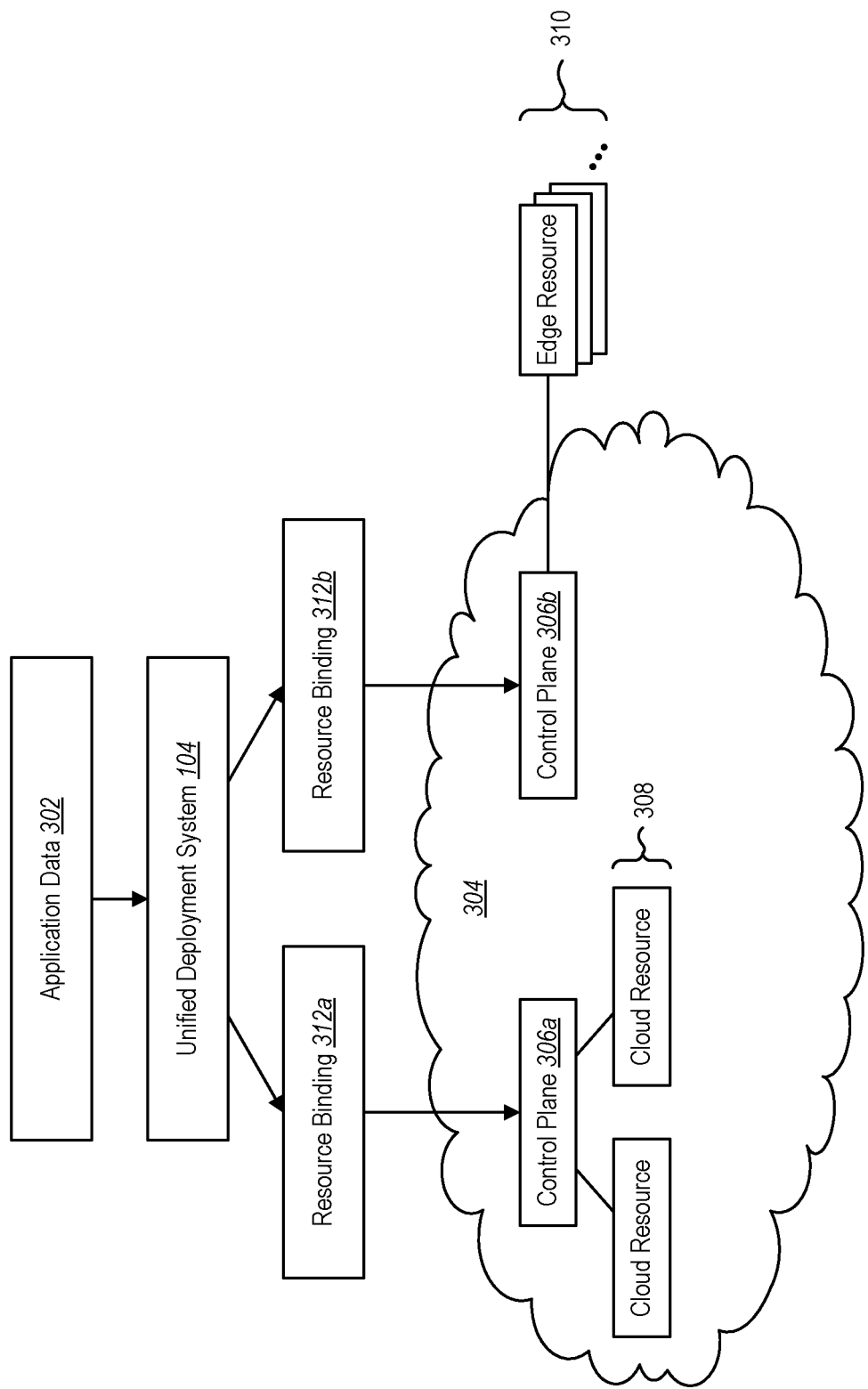
FIG. 3 illustrates an example implementation for deploying cloud-native services across multiple platforms in accordance with one or more implementations.

FIG. 3 illustrates an example in which a unified deployment system 104 deploys cloud-native services of an application across multiple platforms including cloud resources and edge resources. In particular, as shown in FIG. 3, the unified deployment system 104 receives application data 302 including resource identifiers associated with one or more cloud-native services. The application data 302 may include an application file including the resource identifiers. For instance, the application data 302 may include a platform-specific application including instructions that identify cloud-native services. Alternatively, the application data 302 may include a platform-neutral application model including resource identifiers, topology data, and quality of service (QoS) data similar to the cloud-native application model 204 described above. The application data 302 may include any additional data related to deploying cloud-native services identified by the resource identifiers.

Similar to one or more embodiments described above in connection with FIG. 2, the unified deployment system 104 can generate deployment specifications and resource bindings for the resource identifiers and cloud-native services identified within the application data 302. For example, the unified deployment system 104 can generate resource bindings 312a-b including mapping information that associates the application data 302 with various resources of a cloud-computing system 304 as well as edge resources 310 on devices not included within the hierarchy of the cloud-computing system 304.

For example, the unified deployment system 104 can deploy a first cloud-native service to a first control plane 306a by providing a first resource binding 312a and associated application data 302 to the first control plane 306a on the cloud-computing system 304. The first control plane 306a may then utilize the first resource binding 312a and associated application data 302 to schedule providing or otherwise implementing the first cloud-native service via a set of cloud resources 308 on the cloud-computing system 304.

The unified deployment system 104 can additionally deploy a second cloud-native service to a second control plane 306b by providing a second resource binding 312b and associated application data 302 to the second control plane 306b also on the cloud-computing system 304. The second control plane 306b may then utilize the second resource binding 312b and associated application data 302 to schedule providing or otherwise implementing the second cloud-native service via one or more edge resources 310 on one or more edge devices not included within the hierarchy of the cloud-computing system 304.

In one or more embodiments, the unified deployment system 104 deploys services from a single application across the multiple platforms. For example, the unified deployment system 104 may determine that different functions or processes defined by an application would most effectively be carried out (or performed with the least amount of cost or processing expense) by deploying a first service of the application on the cloud resources 308 managed by the first control plane 306a and a second service of the application on the edge resources 310 managed by the second control plane 306b. For instance, the unified deployment system 104 may identify the control planes 306a-b based on a determination that deploying the application via the control planes 306a-b (as opposed to other control planes on the same or different cloud-computing system) would result in the lowest cost or satisfy one or more quality of service (QoS) constraints identified within the application data 202.

Figure 4:
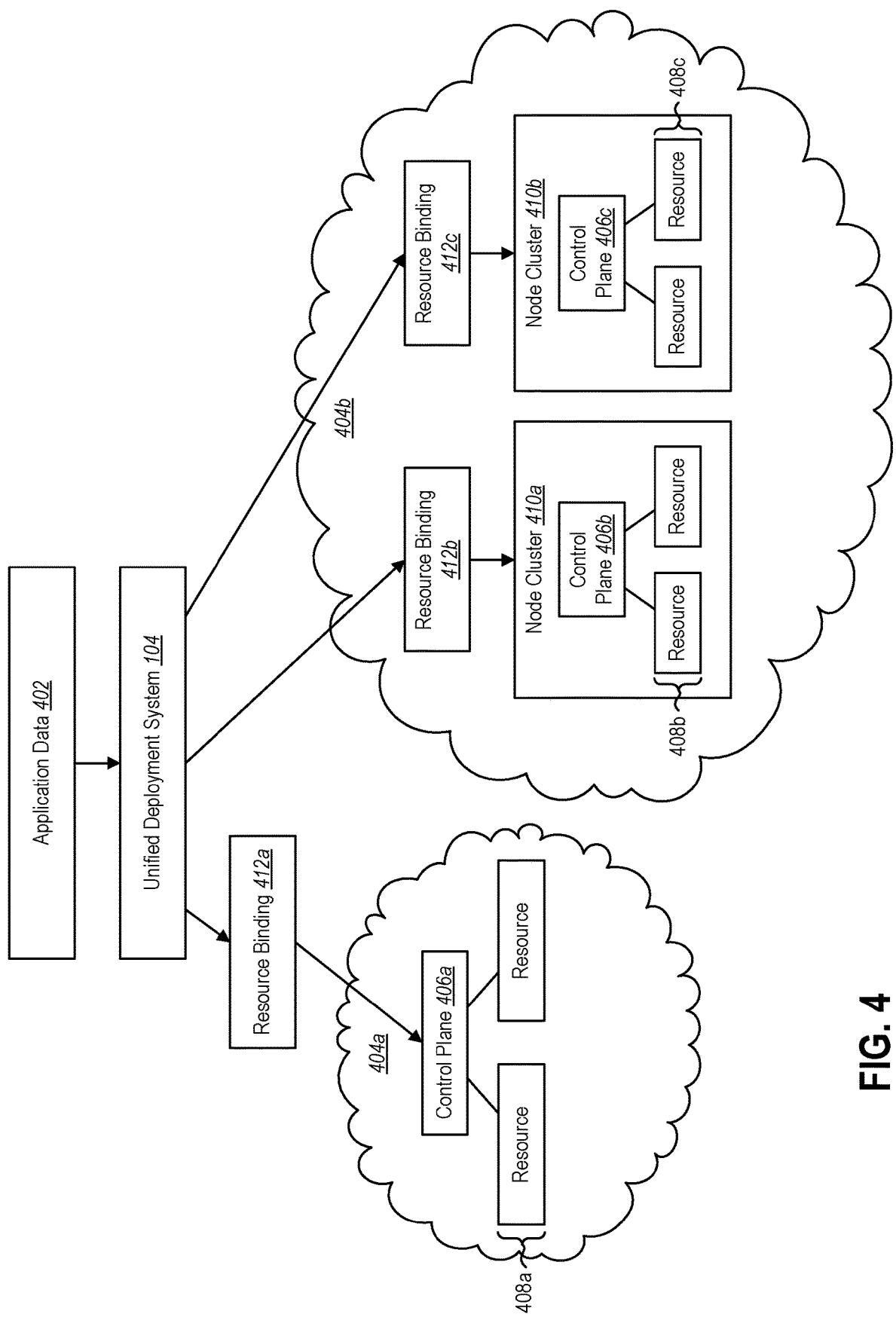
FIG. 4 illustrates another example implementation for deploying cloud-native services across multiple platforms in accordance with one or more implementations.

FIG. 4 illustrates another example in which a unified deployment system 104 deploys cloud-native services of an application across multiple platforms including multiple cloud-computing systems. In particular, as shown in FIG. 4, the unified deployment system 104 receives application data 402 including resource identifiers associated with one or more cloud-native services. Similar to one or more examples described above, the application data 402 may include an application file or any data that includes resource identifiers or otherwise identifies types of cloud-native services to be deployed in a variety of ways.

Based on the application data 402, the unified deployment system 104 may identify resources across a plurality of platforms to carry out functions or services identified by the application data 402. For example, based on topology data, quality of service (QoS) data, or other considerations, the unified deployment system 104 can determine that the cloud-native services should be deployed across a number of control planes 406a-c on different platforms including different cloud-computing systems 404a-b (e.g., two different clouds owned by or managed by different entities). Based on the determination to deploy the cloud-native services to respective platforms and/or services, the unified deployment system 104 can generate resource bindings 412a-c including associations between different cloud-native services and the corresponding deployment platforms.

In particular, the unified deployment system 104 can generate a first resource binding 412a including mapping information between application data 402 (e.g., resource identifiers) and a set of resources 408a on a first cloud-computing system 404a. The unified deployment system 104 can additionally provide the first resource binding 412a and associated application data 402 to a first control plane 406a that manages operation of the first set of resources 408a.

As further shown in FIG. 4, the unified deployment system 104 can additionally generate a second resource binding 412b including mapping information between application data 402 and a second set of resources 408b on a second cloud-computing system 404b. The unified deployment system 104 can provide the second resource binding 412b and associated application data 402 to a second control plane 406b that manages operation of the second set of resources 408b.

As further shown in FIG. 4, the unified deployment system 104 can generate a third resource binding 412c including mapping information between application data 402 and a third set of resources 408c on the second cloud-computing system 404b. The unified deployment system 104 can further provide the third resource binding 412c and associated application data 402 to a third control plane 406c that manages operation of the third set of resources 408c.

As mentioned above, the unified deployment system 104 may provide the resource bindings 412a-c and associated application data 402 to the respective control planes 406a-c. In one or more embodiments, the unified deployment system 104 provides an entire application file to allow the control plane 406a to selectively schedule or otherwise execute instructions from the application data 402 independent from the unified deployment system 104. Thus, the unified deployment system 104 may provide an application file and a resource binding to a control plane even where that control plane only manages a subset of services or functions identified within the application file. Alternatively, rather than providing an entire application file, the unified deployment system 104 may selectively provide a portion of the application data 402 associated with the respective cloud-native services (e.g., the specific resource identifiers and associated topology or QoS data) to be managed by the control planes 406a-c.

While FIG. 4 illustrates an example in which the unified deployment system 104 facilitates deployment of a plurality of cloud-native services across multiple cloud-computing systems 404a-b, FIG. 4 additionally shows that the unified deployment system 104 can deploy different cloud-native services (e.g., of a single application) across different platforms within the same cloud-computing system. For example, as shown in FIG. 4, the unified deployment system 104 deploys a second cloud-native service by providing the second resource binding 412b and associated application data 402 to the second control plane 406b on a first node cluster 410a. As further shown, the unified deployment system 104 deploys a third cloud-native service by providing the third resource binding 412c and associated application data 402 to the third control plane 406c on a second node cluster 410b. The node clusters 410a-b may refer to any grouping of server devices at different geographic locations, on different server regions, on different datacenters, or simply on different virtual groupings of computing devices.

Figure 5A:
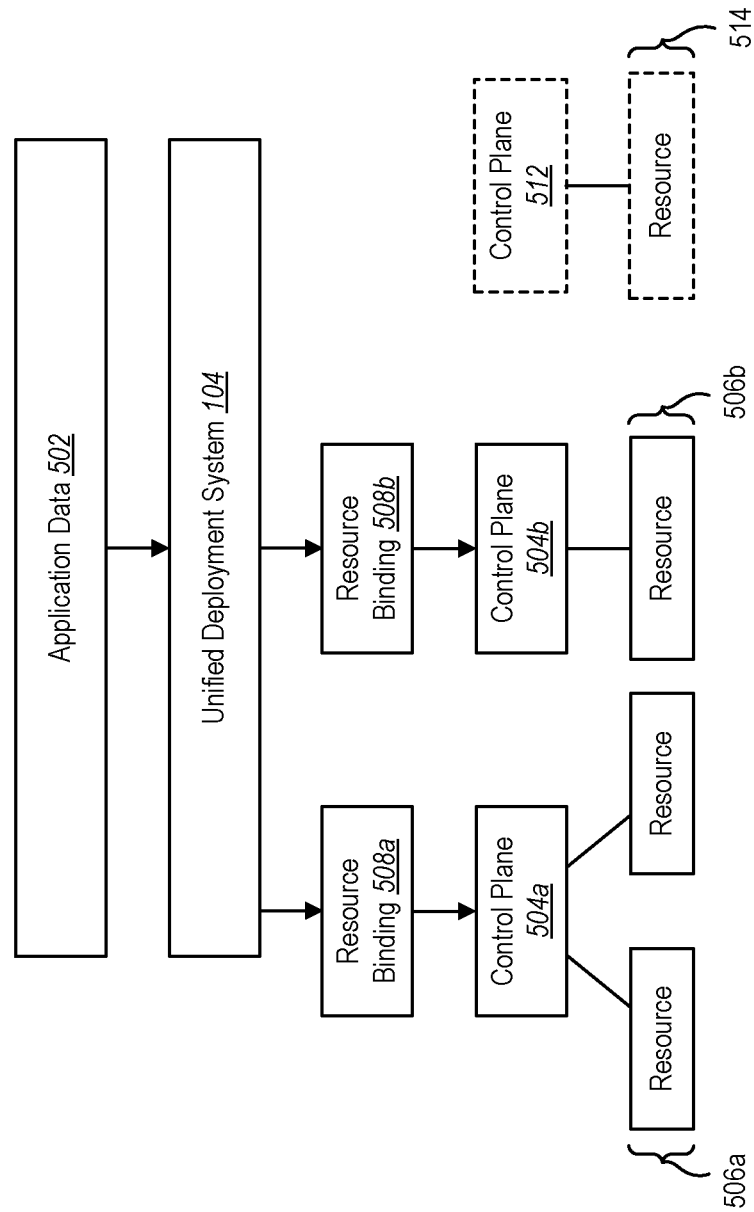
FIGS. 5A and 5B illustrate another example implementation for deploying cloud-native services across multiple platforms in accordance with one or more implementations.
Figure 5B:
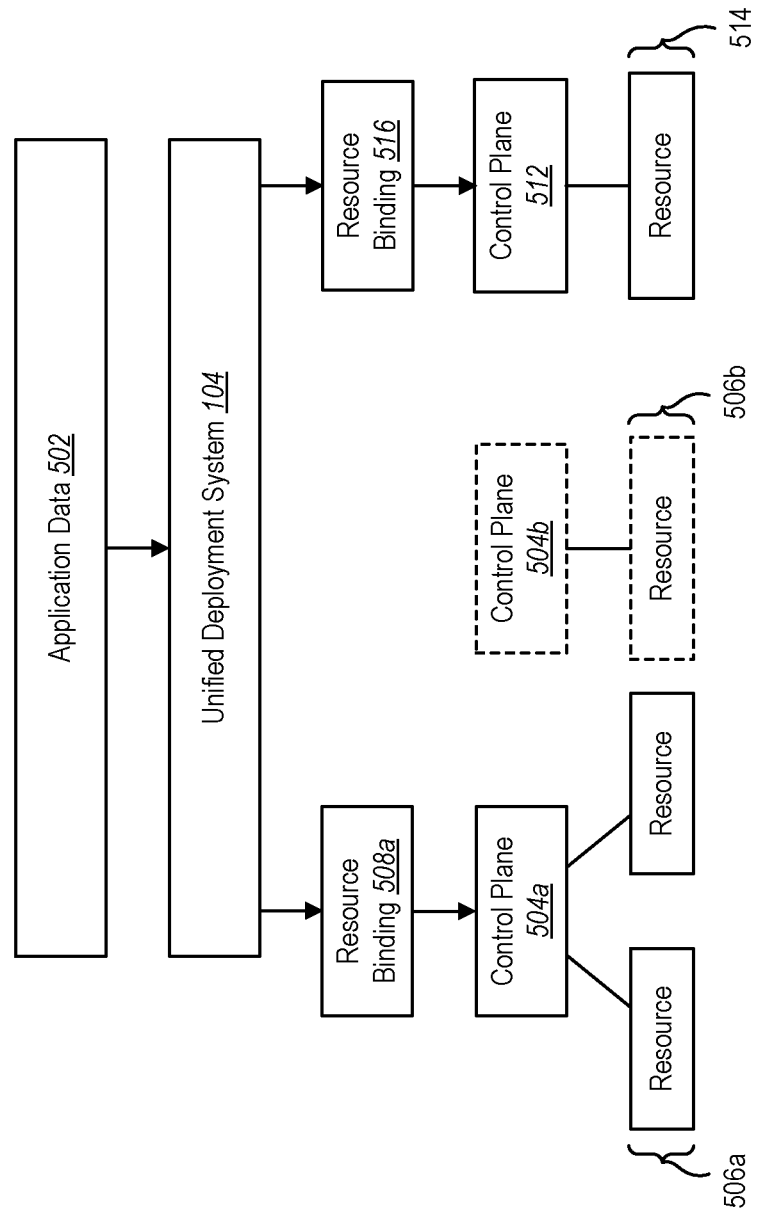

FIGS. 5A-5B illustrate an example implementation in which the unified deployment system 104 facilitates migration of a cloud-native service from a first set of resources managed by a first control plane to another set of resources managed by a second control plane. For example, as shown in FIG. 5A, the unified deployment system 104 can receive application data 502 including an identification of resources or service-types for use in identifying or determining resources on which the cloud-native services should be deployed in accordance with one or more embodiments described above.

Similar to one or more examples described above, the unified deployment system 104 can perform an initial deployment of a first cloud-native service by generating a first resource binding 508a including a deployment specification for the first cloud-native service and providing the first resource binding 508a and associated application data 502 to a first control plane 504a. The first control plane 504a may then schedule operation or execution of services identified by the application data 502 using a first set of resources 506a managed by the first control plane 504a.

The unified deployment system 104 can similarly generate a second resource binding 508b including a deployment specification for a second cloud-native service and provide the second resource binding 508b and associated application data 502 to a second control plane 504b. The second control plane 504b may then schedule operation or execution of services identified by the application data 502 using a second resource 506b managed by the second control plane 504b. As shown in FIG. 5A, the control planes 504a-b may manage respective sets of resources 506a-b having different numbers of resources.

As shown in FIG. 5A, the unified deployment system 104 may identify an additional deployment chain including a control plane 512 configured to manage an associated resource 514. For example, the unified deployment system 104 may detect or otherwise identify that the resource 514 has been registered on a cloud-computing system and provides additional functionality relevant to one or more cloud-native services identified by the application data 502.

In one or more embodiments, the unified deployment system 104 may identify that the newly registered resource 514 (or simply "new resource 514") controlled by an associated control plane 512 (or simply "new control plane 512") provides better access, lower costs, or otherwise performs a particular function or service better than a resource on which a cloud-native service is currently deployed. For example, the unified deployment system 104 may determine that the second cloud-native service should be deployed on the new resource 514 via the third control plane 512 rather than on the second resource 506b via the second control plane 504b.

In accordance with one or more embodiments described above, the unified deployment system 104 can facilitate migration of the second cloud-native service from the second resource 506b (as shown in FIG. 5A) to be deployed on the new resource 514 (as shown in FIG. 5B). To deploy the second cloud-native service on the new resource 514, the unified deployment system 104 can generate a new deployment specification including deployment information associated with deploying the second cloud-native service on the new resource 514 via the new control plane 512. Further, the unified deployment system 104 can re-bind resource identifiers and other data from the application data 502 to the new resource 514 by generating the new resource binding 516 including mapping data between the application data 502 and the new deployment specification.

The unified deployment system 104 can then complete the migration process by redeploying the second cloud-native service to the new resource 514. In particular, the unified deployment system 104 can redeploy the second cloud-native service by providing the new resource binding 516 and associated application data 502 to the new control plane 512, which can schedule operation or execution of services identified by the application data using the new resource 514.

Accordingly, where traditional methods of migrating applications between platforms generally involve writing a new application or scrapping a significant portion of code from a previously developed application, the unified deployment system 104 facilitates convenient migration between control planes by simply generating a deployment specification based on the new platform (e.g., the new resource) and re-binding the service to the new resource. Indeed, rather than developing new instructions, new code, or an entirely new application, the unified deployment system 104 can re-bind the cloud-native service to the new resource and simply redeploy the cloud-native service or application based on the new resource binding(s).

While FIGS. 5A-5B illustrate an example in which the unified deployment system 104 migrates a service from one control plane (the second control plane 504b) to another control plane (new control plane 512) based on identifying a newly registered resource or other resource better equipped to execute a particular service, the unified deployment system 104 may enact a similar migration process to increase fault tolerance for a particular service or application. For example, the unified deployment system 104 may perform a migration of the cloud service from the second resource 506b to the new resource 514 upon detecting that the second resource 506b or associated cloud-computing system has an outage or service failure.

For example, in one or more embodiments, the unified deployment system 104 may identify the control plane 512 and associated resource 514 as a backup control plane and resource capable of performing a service in the case that the second control plane 504b or second resource 506b fail. In response to detecting failure (or in preparation for a potential failure), the unified deployment system 104 can generate a resource binding 516 and deploy the cloud-native service via the new control plane 512 under failure conditions. In this way, the unified deployment system 104 can ensure continued functionality of an application or service in the case that a primary server device fails or service is discontinued on a particular platform for various reasons. In one or more embodiments, this may involve migrating deployment from one cloud-computing system to another cloud-computing system (or from one platform to another platform on the same cloud-computing system).

Figure 6:
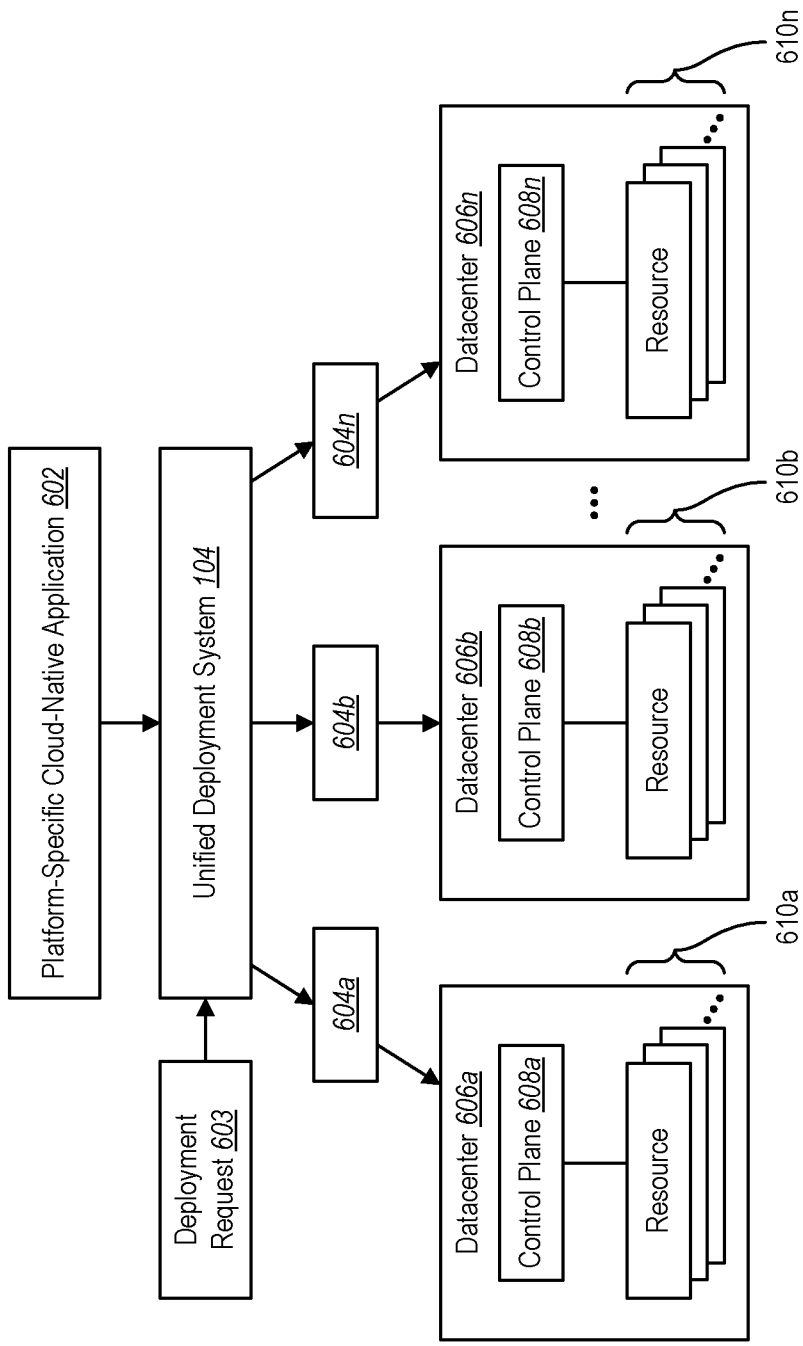
FIG. 6 illustrates an example implementation for deploying a cloud-native application across multiple datacenters in accordance with one or more implementations.

FIG. 6 illustrates an example implementation in which the unified deployment system 104 facilitates a single deployment of an application across multiple datacenters or across different platforms of similar types. For example, as shown in FIG. 6, the unified deployment system 104 can receive a platform-specific cloud-native application 602 including an application configured to be deployed on a particular platform. For instance, the platform-specific cloud-native application 602 (or simply "application 602") may refer to an application deployed multiple times across multiple regions to be made available to users across a variety of geographic locations.

The unified deployment system 104 may additionally receive a deployment request 603 including a request to deploy the application 602 to multiple datacenters. The deployment request 603 may include an identification of control planes and/or datacenters on which to deploy the application. For example, in the example shown in FIG. 6, the deployment request 603 may include an identification of the datacenters 606a-n, control planes 608a-n, and/or sets of resources 610a-n on which to deploy the application 602.

In accordance with one or more embodiments described above, the unified deployment system 104 can generate resource bindings 604a-n for each of control planes 608a-n that includes deployment specifications including data associated with the respective datacenters 606a-n that enables the unified deployment system 104 to deploy the application 602 to the control planes 608a-n across the different datacenters 606a-n. As shown in FIG. 6, the unified deployment system 104 can generate resource bindings 604a-n for each of the datacenters and deploy the application 602 via each of the control planes 608a-n by providing the application 602 and associated resource binding 604a-n to each of the control planes 608a-n. Where the control planes 608a-n employ different formats or protocols, the resource bindings 604a-n may include different mapping data for the respective control planes 608a-n. Alternatively, where the control planes 608a-n use the same or similar formats or protocols, the resource bindings 604a-n may include similar or identical information provided to each of the control planes 608a-n at the respective datacenters 606a-n.

In this way, the unified deployment system 104 can deploy an application 602 to any number of datacenters 606a-n in response to or based on a single deployment request 603. This can significantly reduce overhead of an entity or individual tasked with performing a high number of deployments on individual control planes across a plurality of locations. For example, rather than requiring that an individual or other entity perform an individual deployment of the application 602 locally on each of the datacenters 606a-n, the unified deployment system 104 can connect to each of the datacenters 606a-n and perform a single deployment by generating different resource bindings 604a-n as shown in FIG. 6.

Deploying the application 602 in this manner can additionally reduce processing resources when rolling back deployment of a failed application. For example, where deployment of an application is unsuccessful, the unified deployment system 104 can significantly reduce workload for a customer or other entity by generating new deployment specifications, generating new resource bindings, re-binding the application 602 to the new deployment specifications, and re-deploying the application and resource bindings to each of the datacenters 606a-n. In this way, the owner or developer of the application 602 need not individually redeploy the application to each of the datacenters 606a-n.

Figure 7:
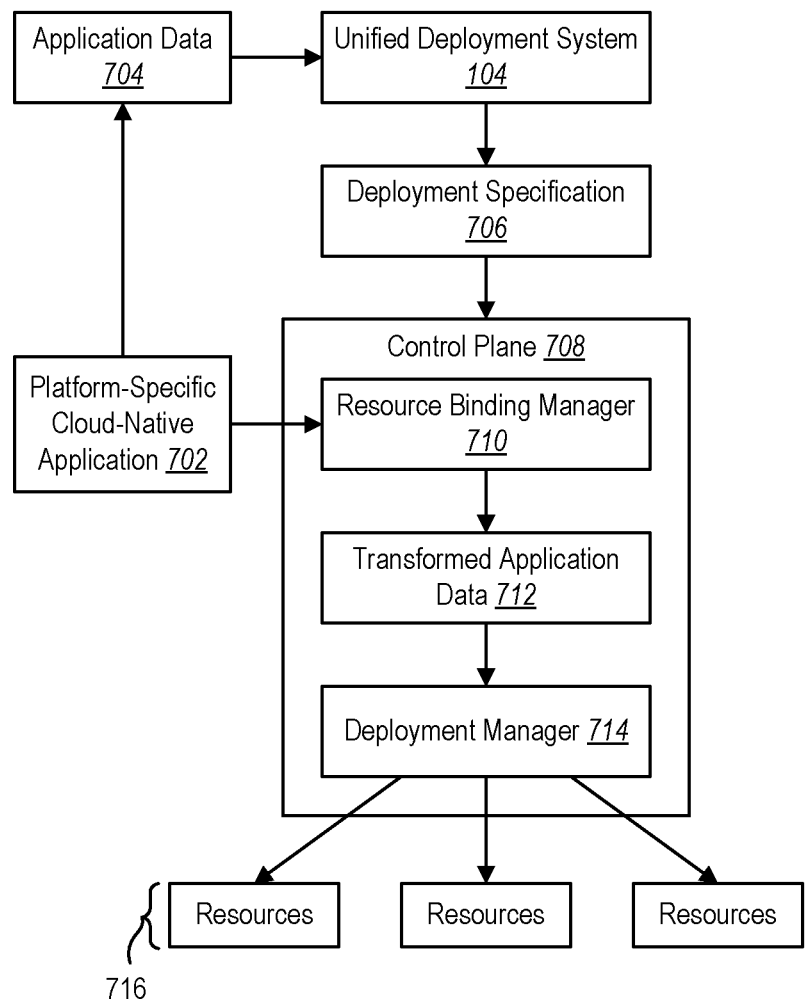
FIG. 7 illustrates an example transformation and deployment of a cloud-native application via a target platform in accordance with one or more implementations.

FIG. 7 illustrates another example implementation in which the unified deployment system 104 and a control plane on a target platform cooperatively deploy a platform-specific application or service to one or more resources on the target platform in accordance with one or more embodiments described herein. In particular, FIG. 7 illustrates an example in which a platform-specific cloud-native application 702 (or simply "application 702") having a format configured to deploy on a first platform can be deployed on a second platform. For example, as shown in FIG. 7, the unified deployment system 104 can receive application data 704 associated with an application 702 including resource identifiers associated with respective functionality or services to be executed or otherwise performed by resources hosted on an original platform (e.g., the original platform identified while developing the application 702).

Similar to examples described above, the unified deployment system 104 can identify resource identifiers associated with different types of cloud-native services or functionalities identified by the application 702. The unified deployment system 104 can additionally generate a deployment specification 706 (or multiple deployment specifications) for the application 702 that enables a control plane 708 to implement the application 702 on a different platform than the platform for which the application 702 was originally designed (e.g., the original platform). In one or more embodiments, the unified deployment system 104 identifies resources on a target platform (e.g., different than the original platform of the application 702) that correspond to functionalities and services identified within the application data 704.

As shown in FIG. 7, the unified deployment system 104 can provide the deployment specification 706 to the control plane 708. The control plane 708 can then store the deployment specification 706 as a mapping library or other file on a storage of the control plane 708 for use in transforming the application 702 to a format that is deployable on a target platform of a plurality of resources 716 managed by the control plane 708. In particular, the deployment specification 706 may include information needed for binding the application 702 to the target platform by generating a resource binding.

As shown in FIG. 7, the control plane 708 includes a resource binding manager 710 and a deployment manager 714. Upon receiving the application 702 for deployment by the control plane 708, the resource binding manager 710 can generate transformed application data 712 by binding the deployment specification 706 to functions or resource identifiers of the application 702. In particular, similar to the binding manager 216 described above in connection with FIG. 2, the resource binding manager 710 can generate resource bindings that associate services and functions identified by the application 702 with the resources 716 managed by the control plane 708. The resource binding manager 710 can provide the transformed application data 712 based on the deployment specification 706 and associated resource identifiers or functions of the application 702 to the deployment manager 714.

The deployment manager 714 may then deploy the services or functions of the application 702 similar to other control planes described above. In particular, the deployment manager 714 can schedule the application or otherwise manage execution of instructions that make up the application 702 using the resources 716 managed by or otherwise associated with the control plane 708.

By providing the deployment specification 706 to the control plane 708 on a target platform in this way, the unified deployment system 104 can expand adoption capabilities for the target platform even where applications are designed or developed to be deployed on an original platform having a different hierarchy or architecture. For instance, where an application is designed for deployment on an original cloud-computing system, the unified deployment system 104 on a target cloud-computing system (e.g., a different cloud-computing system having a different architecture) may nonetheless enable the application to be deployed on the target cloud-computing system by mapping resource identifiers from the application to corresponding resources on the target cloud-computing system and generating a resource binding that bridges the gap between functionality of the application and the target platform. Thus, even where a customer or user does not specifically deploy an application using a resource binding generated by the unified deployment system 104, the application may nonetheless be adopted by the target platform in accordance with the example shown in FIG. 7.

In addition, while FIG. 7 illustrates an example in which the unified deployment system 104 provides a deployment specification to a control plane 708 to enable the control plane 708 to generate a transformed application for deployment on a target platform different than an original platform associated with the application 702, the unified deployment system 104 may also implement deployment of a transformed application using a server device(s) on which the unified deployment system 104 is implemented. For example, in one or more embodiments, the unified deployment system 104 identifies resource identifiers and associated application deployment data (e.g., topology data, quality of service (QoS) data) and generates a platform-neutral application model in accordance with the cloud-native application model 204 described above in connection with FIG. 2. Upon generating the platform-neutral application model, the unified deployment system 104 can deploy a transformation of the application 702 using the application model similar to the process described above in connection with FIG. 2.

Figure 8:
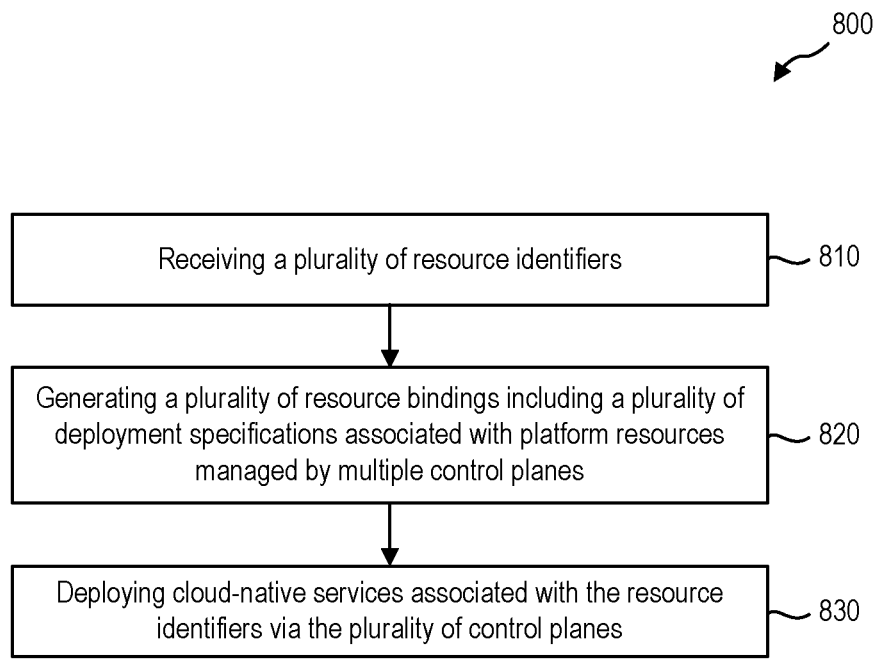
FIG. 8 illustrates an example method for deploying a plurality of cloud-native services across a plurality of platforms in accordance with one or more implementations.
Figure 9:
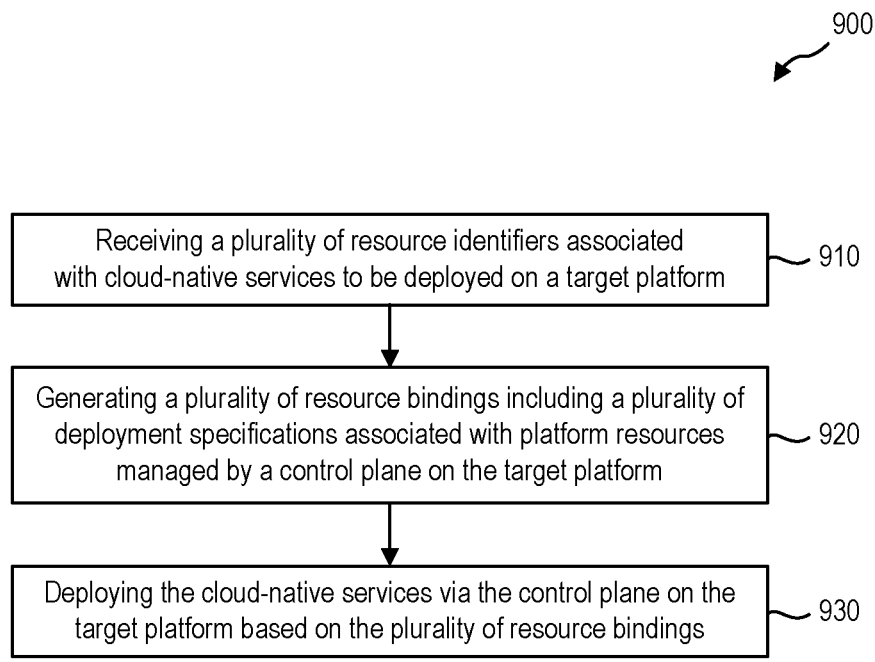
FIG. 9 illustrates an example method for deploying a plurality of cloud-native services on a target platform in accordance with one or more implementations.

Turning now to FIGS. 8-9, these figures illustrate example flowcharts including series of acts for generating and implementing a unified deployment system. While FIGS. 8-9 illustrate acts according to one or more embodiments, alternative embodiments may omit, add to, reorder, and/or modify any of the acts shown in FIGS. 8-9. The acts of FIGS. 8-9 can be performed as part of a method. Alternatively, a non-transitory computer-readable medium can comprise instructions that, when executed by one or more processors, cause a server device to perform the acts of FIGS. 8-9. In still further embodiments, a system can perform the acts of FIGS. 8-9.

For example, FIG. 8 illustrates a series of acts 800 that involve deploying cloud-native services across a plurality of control planes. As shown in FIG. 8, the series of acts 800 includes an act 810 of receiving a plurality of resource identifiers. For example, the act 810 may include receiving a plurality of resource identifiers associated with a plurality of cloud-native services. In one or more embodiments, receiving the resource identifiers includes receiving a cloud-native application file including instructions for executing the plurality of cloud-native services and identifying the resource identifiers from the cloud-native application file.

As another example, receiving the resource identifiers may include receiving a cloud application model including platform-neutral identifiers of resources associated with respective types of cloud-native services. In one or more embodiments, receiving the plurality of resource identifiers associated with a corresponding plurality of cloud-native services comprises receiving a platform-neutral application model including the plurality of resource identifiers. In one or more embodiments, the plurality of resource identifiers include platform-neutral identifications for types of resources associated with executing the corresponding plurality of cloud-native services. In one or more embodiments, the platform-neutral application model further includes connection data associated with a topology for deploying the plurality of cloud-native services to the plurality of platform resources. The platform-neutral application model may further include one or more quality of service (QoS) constraints restricting deployment of the plurality of cloud-native services to one or more platform resources hosted by a cloud-computing system.

As further shown in FIG. 8, the series of acts 800 includes an act 820 of generating a plurality of resource bindings including a plurality of deployment specifications associated with platform resources managed by multiple control planes. For example, the act 820 may include generating a plurality of resource bindings for the plurality of resource identifiers where the plurality of resource bindings include a plurality of deployment specifications associated with a plurality of platform resources managed by a plurality of control planes. In one or more embodiments, the act 820 includes generating a first resource binding for a first resource identifier from the plurality of resource identifiers where the first resource binding includes a first deployment specification associated with a first platform resource managed by a first control plane. In addition, the act 820 can include generating a second resource binding for a second resource identifier from the plurality of resource identifiers where the second resource binding includes a second deployment specification associated with a second platform resource managed by a second control plane.

The control planes (e.g., a first control plane and a second control plane) may be implemented on different platforms. The different platforms may include two different server devices. For example, the different platforms may include different devices of a cloud-computing system. The different platforms may include different groupings of devices on the cloud-computing system. The different platforms may include different datacenters of the cloud-computing system, the different datacenters being implemented at different geographic locations. The different platforms may include different cloud-computing systems. As another example, a first platform resource may include a cloud resource managed by a first control plane on a cloud-computing system while a second platform resource includes an edge resource on an edge device outside the cloud-computing platform.

In addition, the control planes may be configured to schedule performance of cloud-native services on different platforms. For example, a first control plane may be configured to schedule performance of a first cloud-native service using the first platform resource on a first computing device on a first cloud-computing system. In addition, a second control plane may be configured to schedule performance of a second cloud-native service using the second platform resource on a second computing device on the second cloud-computing system. In one or more embodiments, the first platform resource and the second platform resource provide microservices associated with executing different types of cloud-native services on the cloud-computing system.

As further shown in FIG. 8, the series of acts 800 includes an act 830 of deploying cloud-native services associated with the resource identifiers via the plurality of control planes. For example, the act 830 may include deploying the plurality of cloud-native services across a plurality of deployment platforms via the plurality of control planes. In one or more embodiments, the act 830 may include deploying a first cloud-native service from the plurality of cloud-native services via the first control plane and a second cloud-native service from the plurality of cloud-native services via the second control plane.

In one or more implementations, the series of acts 800 includes identifying a failed deployment of the plurality of cloud-native services across the plurality of control planes. In addition, the series of acts 800 may include generating a second plurality of resource bindings for the plurality of resource identifiers where the second plurality of resource bindings include a modified plurality of deployment specifications associated with the plurality of platform resources managed by the plurality of control planes. The series of acts 800 may further include re-deploying the plurality of cloud-native services across the plurality of deployment platforms via the plurality of control planes based on the modified plurality of deployment specifications.

The series of acts 800 may include identifying an additional platform resource managed by an additional control plane where the additional platform resource is configured to execute a cloud-native service from the plurality of cloud-native services associated with a corresponding resource identifier from the plurality of resource identifiers. The series of acts 800 may further include discontinuing management of the cloud-native service by a control plane from the plurality of control planes. The series of acts 800 may additionally include migrating deployment of the cloud-native service to the additional control plane. In one or more embodiments, migrating deployment of the cloud-native services includes generating a new binding comprising a new deployment specification associated with the additional platform resource managed by the additional control plane and re-deploying the cloud-native service to the additional platform resource via the additional control plane.

FIG. 9 illustrates a series of acts 900 that involve deploying cloud-native services via a target control plane in accordance with one or more embodiments described herein. As shown in FIG. 9, the series of acts 900 includes an act 910 of receiving a plurality of resource identifiers associated with cloud-native services to be deployed on a target platform. For example, the act 910 can include receiving a plurality of resource identifiers associated with a plurality of cloud-native services to be deployed on a target platform.

Receiving the plurality of resource identifiers may include receiving an application configured to be deployed on a first platform different than the target platform and identifying the plurality of resource identifiers from the application configured to be deployed on the first platform. The series of acts 900 may further include causing the control plane to receive and store the plurality of deployment specifications on the control plane where the plurality of deployment specifications include a library of mapping data that associates the one or more platform resources managed by the control plane and corresponding cloud-native services executable by the one or more platform resources.

As further shown in FIG. 9, the series of acts 900 includes an act 920 of generating a plurality of resource bindings including a plurality of deployment specifications associated with platform resources managed by a control plane on the target platform. For example, the act 920 can include generating a plurality of resource bindings for the plurality of resource identifiers where the plurality of resource bindings include a plurality of deployment specifications associated with one or more platform resources managed by a control plane on the target platform.

In one or more embodiments, generating the plurality of resource bindings for the plurality of resource identifiers includes binding the plurality of deployment specifications to corresponding resource identifiers from the plurality of resource identifiers. The plurality of deployment specifications may include mapping data that associates the plurality of cloud-native services and the one or more platform resources managed by the control plane. In one or more embodiments, the series of acts 900 includes causing the control plane to generate transformed application data having a format compatible for deployment on the one or more platform resources based on the identified plurality of resource identifiers and plurality of deployment specifications.

As further shown in FIG. 9, the series of acts 900 includes an act 930 of deploying the cloud-native services via the control plane on the target platform based on the plurality of resource bindings. For example, the act 930 may include deploying the plurality of cloud-native services via the control plane on the target platform by assigning the plurality of resource bindings and associated resource identifiers to the control plane on the target platform.

Figure 10:
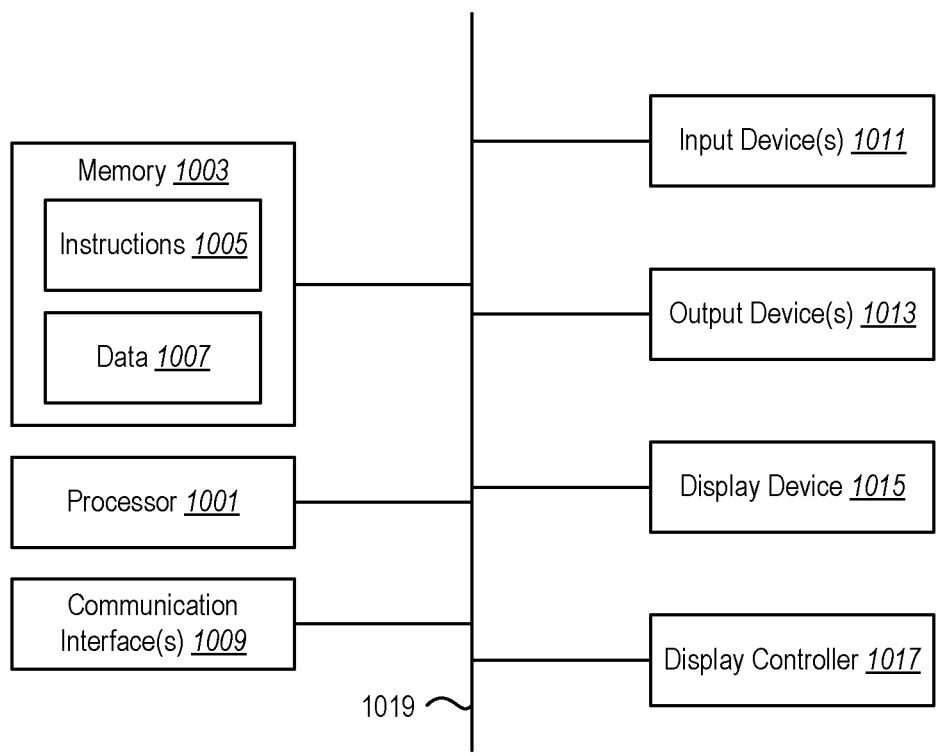
FIG. 10 illustrates certain components that may be included within a computer system.

FIG. 10 illustrates certain components that may be included within a computer system 1000. One or more computer systems 1000 may be used to implement the various devices, components, and systems described herein.

The computer system 1000 includes a processor 1001. The processor 1001 may be a general purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 1001 may be referred to as a central processing unit (CPU). Although just a single processor 1001 is shown in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1005 and data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during execution of the instructions 1005 by the processor 1001.

A computer system 1000 may also include one or more communication interfaces 1009 for communicating with other electronic devices. The communication interface(s) 1009 may be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1000 may also include one or more input devices 1011 and one or more output devices 1013. Some examples of input devices 1011 include a keyboard, mouse, microphone, remote control device, button, joystick, trackball, touchpad, and lightpen. Some examples of output devices 1013 include a speaker and a printer. One specific type of output device that is typically included in a computer system 1000 is a display device 1015. Display devices 1015 used with embodiments disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For the sake of clarity, the various buses are illustrated in FIG. 10 as a bus system 1019.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    deploying a cloud-native application, the cloud-native application including a plurality of resource identifiers associated with a plurality of cloud-native services, wherein the plurality of cloud-native services include:
        a first cloud-native service associated with a first resource identifier, the first cloud-native service being deployable on a first one or more platform resources managed by a first control plane; and
        a second cloud-native service associated with a second resource identifier, the second cloud-native service being deployable on a second one or more platform resources managed by a second control plane, the second control plane being distinct from the first control plane;
    identifying a trigger condition associated with moving deployment of the second cloud-native service to a third one or more platform resources managed by a third control plane, the third control plane being distinct from the first control plane and the second control plane; and
    initiating migration of the second cloud-native service from the second one or more platform resources managed by the second control plane to the third one or more platform resources managed by the third control plane.

2. The method of claim 1, wherein initiating migration of the second cloud-native service includes:
    generating a resource binding including an association between the second cloud-native service and the third one or more platform resources managed by the third control plane; and re-deploying the second cloud-native service from the second one or more platform resources to the third one or more platform resources in accordance with the resource binding.

3. The method of claim 1, wherein the second cloud-native service is re-deployed to the third one or more platform resources without re-deploying the first cloud-native service away from the first one or more platform resources.

4. The method of claim 1, wherein the first one or more platform resources and the second one or more platform resources are hosted by server devices on a first cloud computing system, and wherein the third one or more platform resources is hosted by one or more server devices on a second cloud computing system.

5. The method of claim 1, wherein the first one or more platform resources and the second one or more platform resources are hosted on server devices of different cloud computing systems, and wherein the third one or more platform resources are hosted by one or more server devices on a same cloud computing system as the first one or more platform resources.

6. The method of claim 1, wherein the first one or more platform resources, the second one or more platform resources, and the third one or more platform resources are hosted by server devices on a cloud computing system.

7. The method of claim 1, wherein identifying the trigger condition includes identifying the third one or more platform resources being configurable to host the second cloud-native service being registered on a cloud computing system.

8. The method of claim 1, wherein identifying the trigger condition includes determining that migrating the second cloud-native service from the second one or more resources managed by the second control plane to the third one or more resources managed by the third control plane would increase fault tolerance for the second cloud-native service.

9. The method of claim 1, wherein identifying the trigger condition includes detecting a failure condition of the second one or more platform resources.

10. The method of claim 1, wherein identifying the trigger condition includes identifying a scheduled discontinuation of the second one or more platform resources on a cloud computing system.

11. A method, comprising:
receiving a single deployment request associated with multiple deployments of a cloud-native application, the single deployment request including a plurality of resource identifiers associated with one or more cloud-native services of the cloud-native application, the plurality of resource identifiers being associated with a plurality of platform resources on a plurality of datacenters;
generating a first one or more resource bindings for deployment of the cloud-native application at a first datacenter, the first one or more resource bindings associating a first deployment specification with a first one or more platform resources managed by a first set of one or more control planes on the first datacenter, the first set of one or more control planes being tasked with managing operation of the first one or more platform resources;
generating a second one or more resource bindings for deployment of the cloud-native application at a second datacenter, the second one or more resource bindings associating a second deployment specification with a second one or more platform resources managed by a second set of one or more control planes on the second datacenter being distinct from the first set of one or more control planes, the second set one or more control planes being tasked with managing operation of the second one or more platform resources;
deploying a first instance of the cloud-native application on the first datacenter by deploying the one or more cloud-native services via the first set of one or more control planes; and
deploying a second instance of the cloud-native application on the second datacenter by deploying the one or more cloud-native services via the second set of one or more control planes.

12. The method of claim 11, wherein the first datacenter and the second datacenter are on different regional datacenters of a same cloud computing system.

13. The method of claim 11, wherein the first datacenter and the second datacenter are on different cloud computing systems.

14. The method of claim 11, further comprising:
receiving a request to scale up a deployment of the cloud-native application to a third datacenter;
responsive to the request to scale up the deployment to the third datacenter:
generating a third one or more resource bindings for the third datacenter, the third one or more resource bindings associating a third deployment specification with a third one or more platform resources managed by a third set one or more control planes on the third datacenter being distinct from the first set of one or more control planes and the second set of one or more control planes, the third set of one or more control planes being tasked with managing operation of the third one or more platform resources; and
deploying a third instance of the cloud-native application on the third datacenter by deploying the one or more cloud-native services via the third set of one or more control planes.

15. The method of claim 11,
determining that deployment of the second instance of the cloud-native application has failed; and
based on determining that the deployment of the second instance of the cloud-native application has failed, rolling back deployment of the second instance of the cloud-native application by generating a new second one or more resource bindings and re-binding a new second deployment specification with the second one or more platform resources managed by the second set one or more control planes on the second datacenter.

16. The method of claim 15, wherein rolling back deployment of the second instance of the cloud-native application is performed without modifying deployment of the first instance of the cloud-native application on the first datacenter.

17. A system, comprising:
one or more processors;
memory in electronic communication with the one or more processors; and
instructions stored in the memory, the instructions being executable by the one or more processors to:
deploy a cloud-native application, the cloud-native application including a plurality of resource identifiers associated with a plurality of cloud-native services, wherein the plurality of cloud-native services include:
a first cloud-native service associated with a first resource identifier, the first cloud-native service being deployable on a first one or more platform resources managed by a first control plane; and a second cloud-native service associated with a second resource identifier, the second cloud-native service being deployable on a second one or more platform resources managed by a second control plane, the second control plane being distinct from the first control plane;

identify a trigger condition associated with moving deployment of the second cloud-native service to a third one or more platform resources managed by a third control plane, the third control plane being distinct from the first control plane and the second control plane; and initiate migration of the second cloud-native service from the second one or more platform resources managed by the second control plane to the third one or more platform resources managed by the third control plane.

18. The system of claim 17, wherein initiating migration of the second cloud-native service includes:

generating a resource binding including an association between the second cloud-native service and the third one or more platform resources managed by the third control plane; and re-deploying the second cloud-native service from the second one or more platform resources to the third one or more platform resources in accordance with the resource binding.

19. The system of claim 17, wherein the second cloud-native service is re-deployed to the third one or more platform resources without re-deploying the first cloud-native service away from the first one or more platform resources.

20. The system of claim 17, wherein identifying the trigger condition includes one or more of:

identifying the third one or more platform resources being configurable to host the second cloud-native service being registered on a cloud computing system;

determining that migrating the second cloud-native service from the second one or more resources managed by the second control plane to the third one or more resources managed by the third control plane would increase fault tolerance for the second cloud-native service;

detecting a failure condition of the second one or more platform resources; or identifying a scheduled discontinuation of the second one or more platform resources on a cloud computing system.

* * * * *